United States Patent [19]

Walling

[11] Patent Number: 4,570,705
[45] Date of Patent: Feb. 18, 1986

[54] SHEAVE DRIVE ASSEMBLY FOR FLEXIBLE PRODUCTION TUBING

[76] Inventor: John B. Walling, P.O. Box 16266, Ft. Worth, Tex. 76133

[21] Appl. No.: 593,579

[22] Filed: Mar. 26, 1984

[51] Int. Cl.⁴ .............................................. F21B 19/08
[52] U.S. Cl. ..................................... 166/77; 138/111; 242/54 R
[58] Field of Search .................... 166/77, 78, 380, 385, 166/71, 381, 384; 175/113; 254/325-327, 333; 242/54 R; 138/111-114, 118

[56] References Cited

U.S. PATENT DOCUMENTS

| | | | |
|---|---|---|---|
| 3,690,136 | 9/1972 | Slator et al. | 166/77 X |
| 4,003,435 | 1/1977 | Cullen et al. | 166/77 X |
| 4,145,014 | 3/1979 | Chatard et al. | 242/54 R X |
| 4,336,415 | 6/1982 | Walling | 138/111 X |

Primary Examiner—Stephen J. Novosad
Assistant Examiner—Thuy M. Bui
Attorney, Agent, or Firm—Glaser, Griggs & Schwartz

[57] ABSTRACT

Flexible production tubing is wound about a reel for convenient transport to and from a well site. A submersible pump is attached to the end of the flexible tubing and is inserted through the well casing to a producing formation. The flexible production tubing includes a high strength injection core, a tubular production conduit, auxiliary hydraulic/pneumatic conduits, signal conductors, power conductors and a load bearing tension member. Insertion and withdrawal of the flexible tubing and pump are accomplished by a hydraulically powered drive assembly mounted above the well head. The production tubing is characterized by a generally pentagonal cross-section and is compressively engaged between a hydraulically powered drive sheave and a pneumatically biased idler sheave.

2 Claims, 2 Drawing Figures

SHEAVE DRIVE ASSEMBLY FOR FLEXIBLE PRODUCTION TUBING

BACKGROUND OF THE INVENTION

1. Field of the Invention:

The present invention relates generally to well production equipment, and in particular, to apparatus for inserting and withdrawing flexible production tubing into and out of a well.

2. Description of the Prior Art:

Submersible pumps of the type in which the pumping force is derived from electrical, hydraulic, or pneumatic power applied downhole represent a significant improvement over the reciprocating sucker rod approach. According to conventional practice, a submersible pump which is driven downhole by electrical, hydraulic or pneumatic driving means is supported at the end of a long string of steel tubing joints which are coupled to each other by pin-and-box threaded connections. Power conductors, signal conductors and hydraulic/pneumatic conduits coupled to the downhole pump are bundled together within an external umbilical cable assembly and are secured to the rigid production tubing joints.

Although large diameter steel production tubing has great strength and durability, it requires a substantial capital investment. The procedure of running rigid sections of production tubing into and out of the well bore is complicated by the external umbilical cable assembly. Moreover, the steel production tubing, as well as the pump, is subject to corrosion so that it may be necessary to pull the production tubing from the casing and repair the pump or replace damaged production tubing sections from time to time. When such workover operations become necessary, a portable installation called a workover rig must be brought to the well site and set up. Generally, these rigs consist of a heavy derrick or mast which support block and tackle draw works for pulling the pipe string from the well. The workover rigs are usually heavy and difficult to erect and must be capable of lifting the substantial load imposed by the rigid pipe string.

An overriding concern in the operation of a producing well is to get the necessary equipment into and out of the well as rapidly as is economically possible. The efficiency of the pipe-handling operation is limited by such factors as the running speed of the hoist rig, the time required to make up or break tool joints during stabbing operations, the time required to mechanically couple and decouple the hoist rig and the pipe string, and the time required to transport lengths of pipe from the well head to a storage station during recovery operations and to transport lengths of pipe from the storage station to the well head during launching operations. As the length of the pipe string increases to reach the producing formation of deep wells, the pipe handling equipment must safly support the large load of the pipe string and permit the efficient execution of launching and recovery operations while preserving the structural integrity of the pipe string during the handling operations.

It will be appreciated that the substantial capital expenditure required for large diameter steel production tubing, and the expense associated with deployment, recovery and repair or replacement of the rigid production tubing make its use prohibitive in low production wells, and account for a substantial percentage of the overall production costs of other wells.

For the foregoing reasons, there is considerable interest in improving production systems in which the rigid production tubing is replaced by less expensive flexible production tubing which is relatively easy to deploy and recover. Examples of production systems which utilize flexible production tubing are disclosed in U.S. Pat. Nos. 4,336,415 and 4,345,784, both by John B. Walling.

OBJECTS OF THE INVENTION

It is therefore, the principal object of the present invention to provide apparatus for deploying and recovering relatively lightweight, high strength flexible production tubing.

A related object of the invention is to provide a sheave drive assembly for inserting and withdrawing flexible production tubing into and out of a well, respectively.

A specific object of the invention is to provide sheave drive apparatus for straightening flexible production tubing as it is unwound from a reel and inserted into a well.

SUMMARY OF THE INVENTION

The present invention is adapted for use in combination with flexible tubing of the type intended for producing a well. Rigid production tubing and sucker rods are totally eliminated and are replaced by flexible production tubing in which a flexible production conduit, electrical conductors, load support tension member, and hydraulic/pneumatic conduits are embedded within a flexible, high tensile strength core. The flexible production tubing is coupled to a submersible pump which includes drive means such as an electrical, hydraulic, or pneumatic motor which is driven downhole by electrical or hydraulic/pneumatic power transmitted through auxillary conduits or conductors of the flexible production tubing assembly.

The flexible production tubing is wound about a reel for convenient transport to and from a well site. A submersible pump is attached to the end of the flexible tubing and is lowered through the well casing to the producing formation. Insertion and withdrawal of the flexible tubing is accomplished by a hydraulically powered drive assembly erected adjacent the well head equipment. The flexible tubing is characterized by a generally pentagonal cross-section and has diverging sidewalls which are compressively engaged by complementary base and flank portions of a hydraulically powered drive sheave and a free-wheeling idler sheave. The force of frictional engagement is developed by a pneumatic cylinder which drives the idler sheave against the tubing.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

DETAILED DESCRIPTION OF THE PREFERRED EMBODIMENTS

Figure 1:
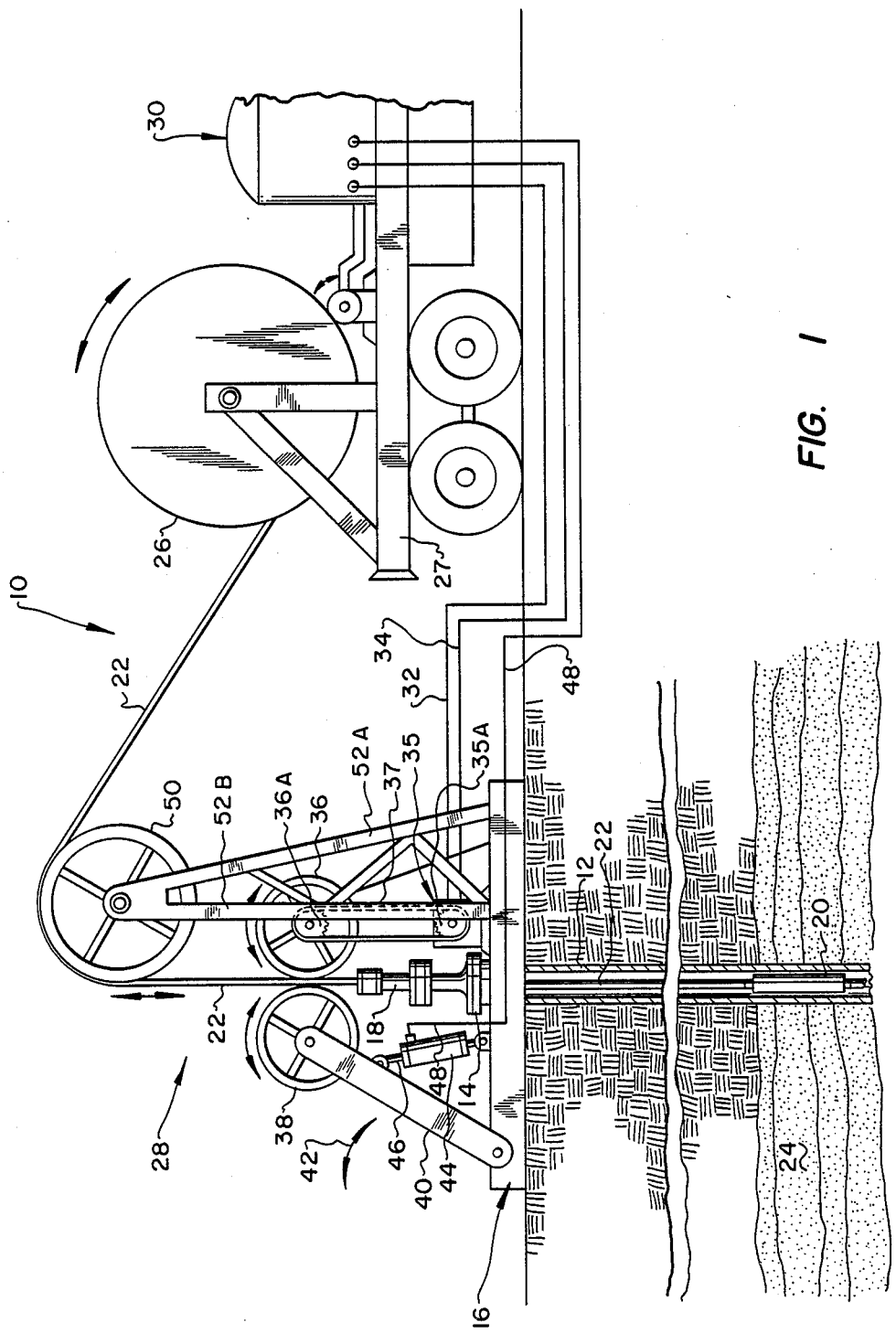
FIG. 1 is a side elevation view which illustrates the installation of a submersible pump in a well bore in which the submersible pump is supported by a length of flexible production tubing; and, FIG. 2 is a sectional view, partly broken away, of a length of flexible production tubing engaged by a drive sheave and an idler sheave.

In the description which follows, like parts are marked throughout the specification and drawings with the same reference numerals, respectively. The drawings are not necessarily to scale and in some instances, proportions have been exaggerated in order to more clearly depict certain features of the invention.

Referring now to FIG. 1, a pump installation rig 10 is set up adjacent a well site in which a well casing 12 is terminated by a lower well head flange 14 and is anchored to a concrete foundation block 16. A slip and packer assembly 18 extends above the lower flange 14. Extending into the bore of the well casing 12 is a submersible pump 20 which is supported by a length of flexible production tubing 22 for recovering fluids from a producing formation 24. The pump 20 is inserted into and retracted out of the well casing 12 as the flexible tubing is played out and taken up by a reel 26. The reel 26 is mounted for rotation on a truck bed 27. The tubing 22 is engaged by a sheave drive assembly 28 and is inserted or retracted according to hydraulic control signals generated at an operator console 30. Pressurized hydraulic fluid is conducted from the control station 30 along conduits 32, 34 to a hydraulic drive motor 35. The hydraulic drive motor 35 is coupled to a drive sheave 36 which engages one side of the flexible tubing 22. A rotary driving force is transmitted by drive sprocket 35A through chain 37 to sprocket 36A of the drive sheave.

The opposite side of the flexible tubing 22 is engaged by a free-wheeling idler sheave 38. The idler sheave 38 is supported for rotation on a movable support arm 40. The support arm 40 is pivotally attached at its lower end to the concrete block 16 for movement into and out of engagement with the flexible production tubing 22 as indicated by the arrow 42.

The idler sheave 38 is moved into and out of engagement with the production tubing 22 by a pneumatic power cylinder 44. The power cylinder 44 has an extendable piston rod 46 which is pivotally coupled to the support arm 40. The lower end of the pneumatic cylinder 44 is pivotally coupled to the well head block 16. The pneumatic power cylinder 44 is single acting and is actuated by a pneumatic charge line 48. When the pneumatic cylinder is actuated, the piston rod 46 is retracted, thereby driving the idler sheave 38 into yieldable engagement with the flexible production tubing 22.

A crown sheave 50 is supported at an elevated position over the slip and packer assembly 18 and sheave drive assembly 28. The crown sheave 50 is supported in boresight alignment with the slip assembly 18 by tower legs 52A, 52B which are anchored into the concrete block 16. The flexible tubing 22 is reeved around the crown sheave 50, through the nip of the drive sheaves 36, 38 and into the slip and packer assembly 18.

Figure 2:
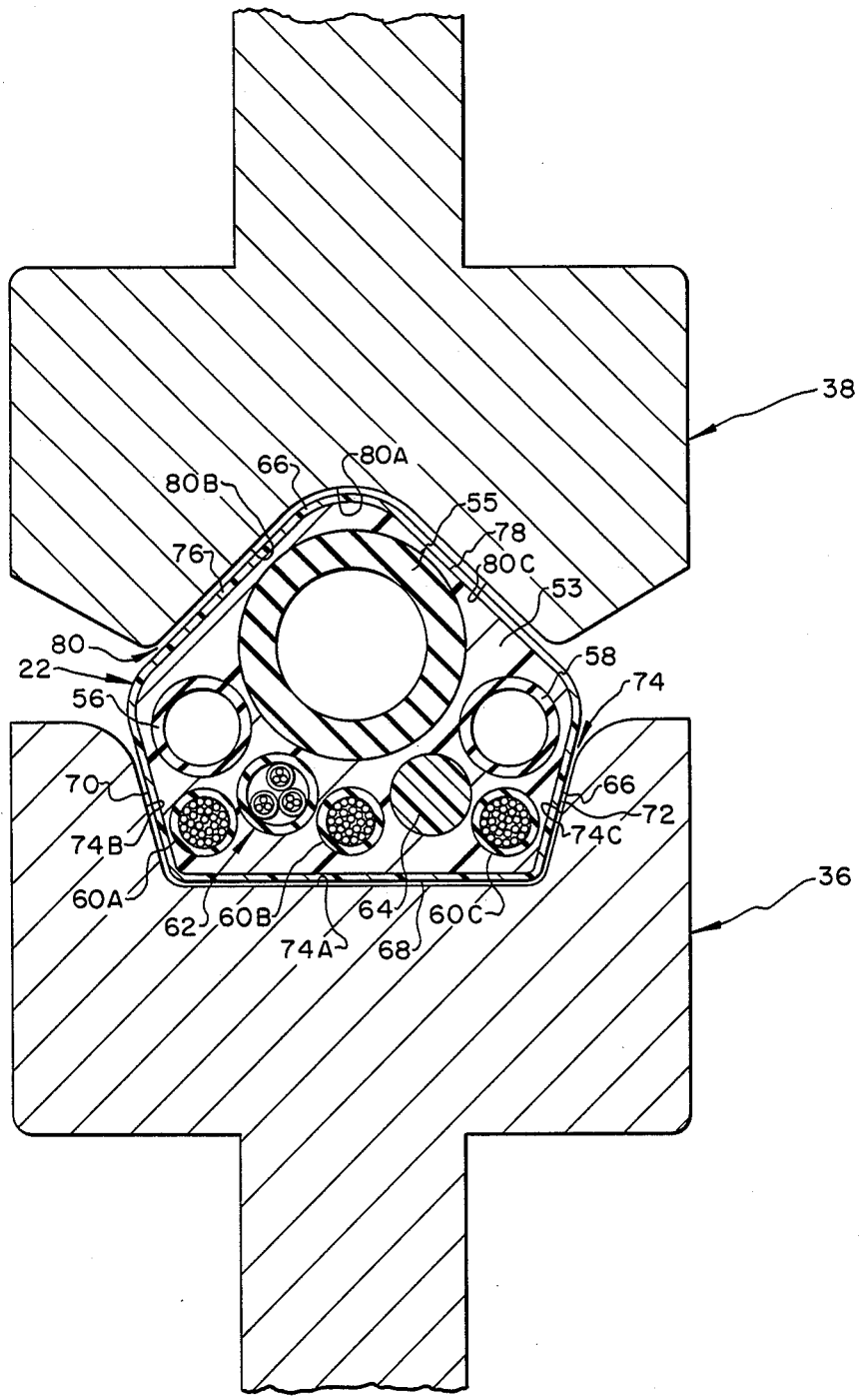

Referring now to FIG. 2, the flexible production tubing assembly 22 includes a high strength injection core 53 of a durable material in which a tubular production conduit 55 is embedded. Additionally, hydraulic charge and return conduits 56, 58 are also embedded within the injection core on opposite sides of the production conduit. Power conductors 60A, 60B, 60C and a bundle of signal conductors 62 are also embedded within the injection core 53. These power conductors, signal conductors, and flow conduits are coupled to the downhole pump 20 as described in U.S. Pat. Nos. 4,336,415 and 4,345,784.

The injection body 53 comprises Nylon or Teflon polymer material. Teflon polymer is preferred for high temperature, corrosive environment usage. For certain applications, the injection body 53 is reinforced with a load bearing, high tensile strength tension member 64. The tension member 64 preferably comprises a twisted weave rope of synthetic fiber strand material such as aromatic polyimide sold under the trademark Nomex or Kevlar by E. I. DuPont DeNemours. The flexible, load bearing tension member 64 extends axially along the length of the injection body 53. The injection body 53 is enclosed by a tubular sheath 66 of high strength, durable polymer material such as Nylon or Teflon. If desired, a braided sheath (not illustrated) of polyester strands may be interposed between the outer protective sheath 66 and the injection body 53 to improve the burst strength of the assembly.

The weight of the submersible pump 20, which may amount to several hundred pounds, will in some applications pull the flexible tubing 22 through the well bore without the requirement of snubbing. However, snubbing may be required under certain circumstances. Moreover, because of the elastic memory characteristic of the flexible tubing, it has a tendency to curl as it is unwound from the reel 26. Thus, the flexible tubing 22 must be straightened as it is pulled off the reel and inserted into the well bore.

According to an important feature of the invention, the flexible tubing 22 is injected into the well bore and straightened simultaneously by the crown sheave 50 and drive sheave assembly 28. The production tubing 22 is pulled from the reel 26 around the crown sheave 50 and downwardly through the nip of the drive sheave 36 and idler sheave 38. A frictional traction force is developed as the production tubing 22 is compressed between the drive sheave 36 and idler sheave 38. The magnitude of the traction force developed is proportional to the degree of frictional engagement of the drive sheave and idler sheave against the production tubing 22.

According to an important aspect of the invention, frictional engagement is enhanced by providing the production tubing 22 with a generally pentagonal cross-section having diverging sidewalls which are compressively engaged by the hydraulically powered drive sheave 36. The preferred pentagonal cross-section arrangement is illustrated in FIG. 2. In that arrangement, the production tubing is provided with a base sidewall 68 and diverging flank sidewalls 70, 72. The sidewalls 68, 70 and 72 are substantially flat and are received within a complementary groove 74 in the sheave 36. The groove 74 is formed by a base sidewall portion 74A and diverging flank sidewall portions 74B, 74C. The groove 74 is generally V-shaped, with an apex truncated by base portion 74A. The sidewall portions 74B, 74C diverge outwardly with respect to the base portion 74A. The tubing sidewalls 68, 70 and 72 are driven into compressive, frictional engagement with the groove sidewall portions 74A, 74B and 74C of the sheave 36 by the idler sheave 38.

The upper half of the production conduit 22 is bounded by substantially flat, diverging sidewalls 76, 78. The diverging sidewalls of the upper and lower halves transition along gradually curved edges to form a continuous sidewall boundary, which approximates, in cross-section, a pentagon with rounded edges. The idler sheave 38 is provided with a groove 80 having diverging sidewall portions 80B, 80C which conform with the outwardly diverging sidewalls 76, 78 of the upper half of the production conduit 22. The groove 80 is generally V-shaped, with an apex truncated by curved base portion 80A. The sidewall portions 80B, 80C diverge outwardly with respect to the curved base portion 80A.

Although a preferred embodiment of the invention has been described in detail, it should be understood that various changes, substitutions and alterations can be made therein without departing from the spirit and scope of the invention as defined by the appended claims.

What is claimed is:

1. Apparatus for inserting and withdrawing flexible production tubing into and out of a well, said flexible production tubing having a first plurality of sidewall portions joined together and transitioning along one or more curved apex sidewall portions constituting a first frictional drive surface, and a second plurality of sidewall portions being joined by one or more curved apex sidewall portions constituting a second frictional drive surface; said apparatus comprising, in combination:

a crown sheave mounted for rotation adjacent the well providing rotatable support for the flexible production tubing between the well and an external reel;

a drive sheave assembly disposed adjacent the well for inserting and retracting the flexible production tubing into and out of the well bore, said drive sheave assembly including a drive sheave having an annular groove formed by drive sheave sidewall portions which conform, in cross section, with the first frictional drive surface of the flexible production tubing and an idler mounted for pivotal movement into and out of engagement with the flexible production tubing, said idler sheave having an annular groove formed by idler sheave sidewall portions which conform, in cross section, with the second frictional drive surface of the flexible production tubing; and, power means coupled to the idler sheave for driving the idler sheave into yieldable engagement with the second frictional drive surface of the flexible production tubing.

2. Apparatus for inserting and withdrawing flexible production tubing into and out of a well comprising, in combination:

a crown sheave mounted for rotation adjacent the well providing rotatable support for the flexible production tubing between the well and a supply reel;

a drive sheave having an annular groove for engaging the flexible production tubing;

rotary power means coupled to said drive sheave for driving it in rotation;

an idler sheave mounted for pivotal movement into and out of engagement with the flexible production tubing, said idler sheave having an annular groove for receiving and engaging the flexible production tubing; and, power means coupled to the idler sheave for driving the idler sheave into yieldable engagement with the flexible production tubing.

* * * * *